US010710672B2

(12) United States Patent
Dunlap, III et al.

(10) Patent No.: US 10,710,672 B2
(45) Date of Patent: Jul. 14, 2020

(54) BICYCLE RIM BRAKE

(71) Applicant: SRAM, LLC, Chicago, IL (US)

(72) Inventors: Charles Dunlap, III, Manitou Springs, CO (US); Brian Jordan, Highland Park, IL (US)

(73) Assignee: SRAM, LLC, Chicago, IL (US)

( * ) Notice: Subject to any disclaimer, the term of this patent is extended or adjusted under 35 U.S.C. 154(b) by 0 days.

(21) Appl. No.: 16/127,992

(22) Filed: Sep. 11, 2018

(65) Prior Publication Data

US 2019/0009857 A1  Jan. 10, 2019

Related U.S. Application Data

(62) Division of application No. 14/850,700, filed on Sep. 10, 2015, now Pat. No. 10,207,767.

(51) Int. Cl.
  B62L 1/16 (2006.01)
  B62L 3/02 (2006.01)

(52) U.S. Cl.
  CPC ............... B62L 1/16 (2013.01); B62L 3/023 (2013.01)

(58) Field of Classification Search
  CPC .................................. B62L 1/16; B62L 3/023
  See application file for complete search history.

(56) References Cited

U.S. PATENT DOCUMENTS

| 2,569,012 | A |  | 9/1951 | Lauer |  |
|---|---|---|---|---|---|
| 3,139,762 | A |  | 7/1964 | Giuseppe |  |
| 3,368,648 | A |  | 2/1968 | Brownyer |  |
| 3,899,057 | A |  | 8/1975 | Carre |  |
| 4,121,697 | A |  | 10/1978 | Kobelt et al. |  |
| 4,290,507 | A |  | 9/1981 | Brown |  |
| 5,425,434 | A | * | 6/1995 | Romano | B62L 1/16 188/24.15 |
| 5,443,134 | A |  | 8/1995 | Gajek et al. |  |
| 8,336,680 | B2 |  | 12/2012 | Nago |  |
| 8,342,295 | B2 | * | 1/2013 | Nago | B62L 1/16 188/24.12 |
| 8,651,243 | B2 |  | 2/2014 | Nago |  |
| 8,739,940 | B2 |  | 6/2014 | Nago |  |
| 8,869,949 | B2 |  | 10/2014 | Jordan et al. |  |
| 8,997,943 | B2 | * | 4/2015 | Nago | B62L 1/16 188/24.12 |
| 9,233,731 | B1 |  | 1/2016 | Nago |  |
| 2006/0113151 | A1 | * | 6/2006 | Tsai | B62L 1/14 188/24.12 |
| 2009/0038893 | A1 |  | 2/2009 | Lin |  |

(Continued)

FOREIGN PATENT DOCUMENTS

| DE | 3303586 | 8/1984 |
|---|---|---|
| TW | M446749 | 2/2013 |
| TW | M482551 | 7/2014 |

*Primary Examiner* — Bradley T King

(57) ABSTRACT

Responsive to a hydraulic piston advancing out of a piston housing in a second brake arm and contacting a piston cam surface of a first brake arm, the second brake arm pivots around a second pivot. As this is happening, a cam surface in the second brake arm lifts a contact surface of a first force transfer member of the first brake arm, imparting torque to the first brake arm which then pivots around a first pivot. The cam surface is shaped to impart synchronous motion to the first and second pad holders. Splitting one of the brake arms with a centering member permits a centering adjust feature.

17 Claims, 15 Drawing Sheets

(56) References Cited

U.S. PATENT DOCUMENTS

| | | |
|---|---|---|
| 2009/0078512 A1 | 3/2009 | Edwards et al. |
| 2011/0011683 A1 | 1/2011 | Tetsuka et al. |
| 2011/0139552 A1 | 6/2011 | Nago |
| 2012/0222922 A1 | 9/2012 | Nago |
| 2013/0341128 A1 | 12/2013 | Jordan et al. |
| 2014/0041969 A1 | 2/2014 | Tsai |
| 2014/0041971 A1 | 2/2014 | Hujer |
| 2016/0272275 A1* | 9/2016 | Nakakura ................ B62L 1/14 |
| 2016/0280318 A1 | 9/2016 | Wen |
| 2017/0001681 A1* | 1/2017 | Rosati ..................... B62L 1/14 |
| 2017/0036732 A1* | 2/2017 | Kakimoto ............... B62L 1/16 |
| 2018/0043964 A1* | 2/2018 | Wen ........................ B62L 1/16 |
| 2019/0009857 A1* | 1/2019 | Dunlap, III ............ B62L 3/023 |

* cited by examiner

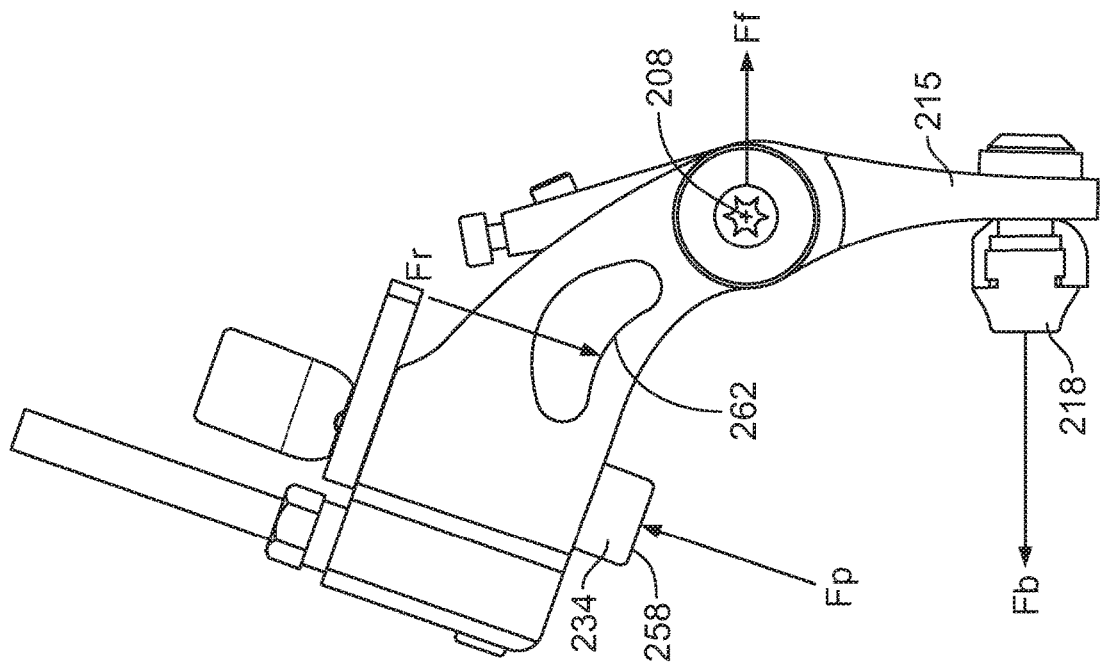
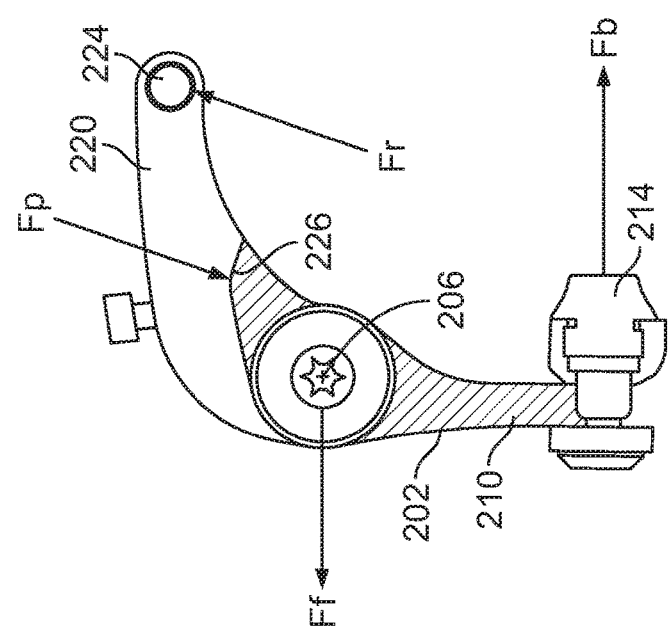
FIG. 10B
FIG. 10A

BICYCLE RIM BRAKE

REFERENCE TO RELATED APPLICATIONS

This application is a divisional of U.S. patent application Ser. No. 14/850,700, filed Sep. 10, 2015, the contents of which are herein incorporated in their entirety.

BACKGROUND

The present disclosure is directed to bicycle brakes and, more particularly, to bicycle rim brakes.

In general, there are two types of rim brakes. One is referred to as a single pivot rim brake and the other is referred to as a two-post rim brake. The two-post rim brake usually includes a first brake arm pivotable about a first axis and a second brake arm pivotable about a second axis. The first and second brake arms include a link or connection therebetween for moving the brake pads at the same rate. A disadvantage of a two-post brake is the braked induced frame/fork post loads. There is a need to provide a two-post rim brake with reduced frame/fork post loads.

SUMMARY

According to one aspect, a rim brake is provided that uses only one hydraulic piston assembly to actuate opposed angular motion of first and second brake arms. The first brake arm has a first pivot adapted for pivotal attachment to the bicycle. A first brake pad holder of the first brake arm downwardly depends from the first pivot. The first brake pad holder is configured to move in a first arcuate direction around the first pivot. The second brake arm has a second pivot adapted for pivotal attachment to the bicycle. A second brake pad holder of the second brake arm downwardly depends from the second pivot. The second brake pad holder is configured to move in a second arcuate direction around the second pivot opposite the first arcuate direction. The second pivot is horizontally spaced from first pivot. The only one hydraulic piston assembly includes a piston slidably mounted in a piston housing of the second brake arm, the piston advancing along a piston axis responsive to hydraulic fluid pressure to cause a non-horizontal force to be exerted on the first brake arm to move the second brake pad holder in the second arcuate direction around the second pivot.

According to another aspect, a rim brake has first and second brake arms. The first brake arm has a first pivot from which downwardly extends a first pad holder. The second brake arm has a second pivot from which downwardly extends a second pad holder. Responsive to actuation of the brake, the first pad holder pivots in a first angular direction, and the second pad holder pivots in an opposite, second angular direction. The second pivot is horizontally spaced from the first pivot. The second brake arm further includes a biasing member that upwardly extends from the second pivot. This biasing member pivots around the second pivot with the second pad holder as a unit. The second brake arm further has a force transfer member that upwardly extends from the second pivot. This force transfer member is operable to transmit torque in the second angular direction to the second pad holder upon actuation of the brake. A centering member, such as a set screw, defines the angular position of the biasing member relative to the force transfer member. The centering member is adjustable to move the second pad holder without moving the first pad holder, thereby providing a center adjust function.

BRIEF DESCRIPTION OF THE DRAWINGS

Further aspects and their advantages can be discerned in the following detailed description, in which like characters denote like parts and in which:

FIGS. 10A and 10B are force diagrams of different components of the brake shown in FIG. 2;

DETAILED DESCRIPTION

Figure 1:
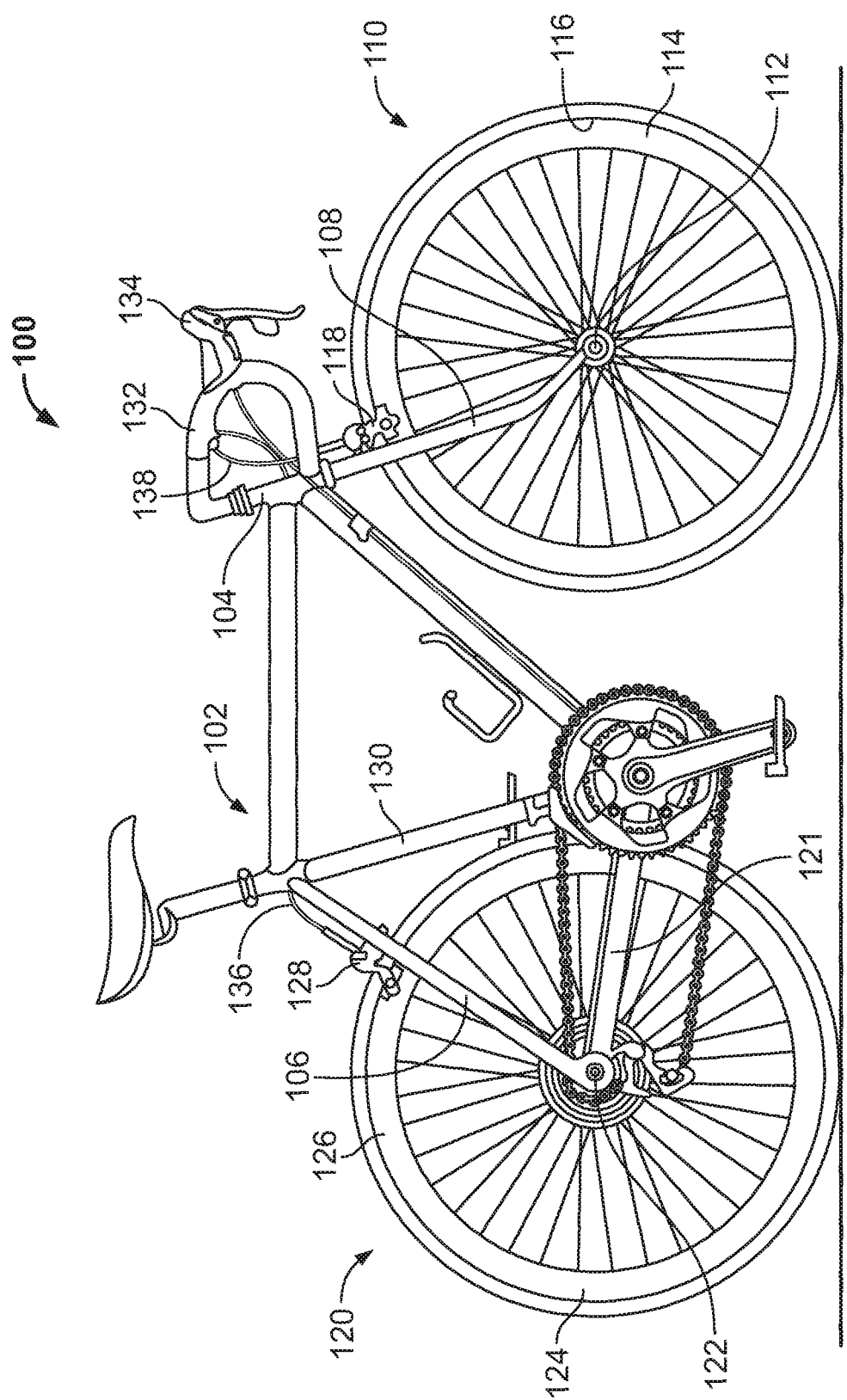
FIG. 1 is an elevational view of a bicycle employing rim brakes according to the one embodiment.
Figure 2:
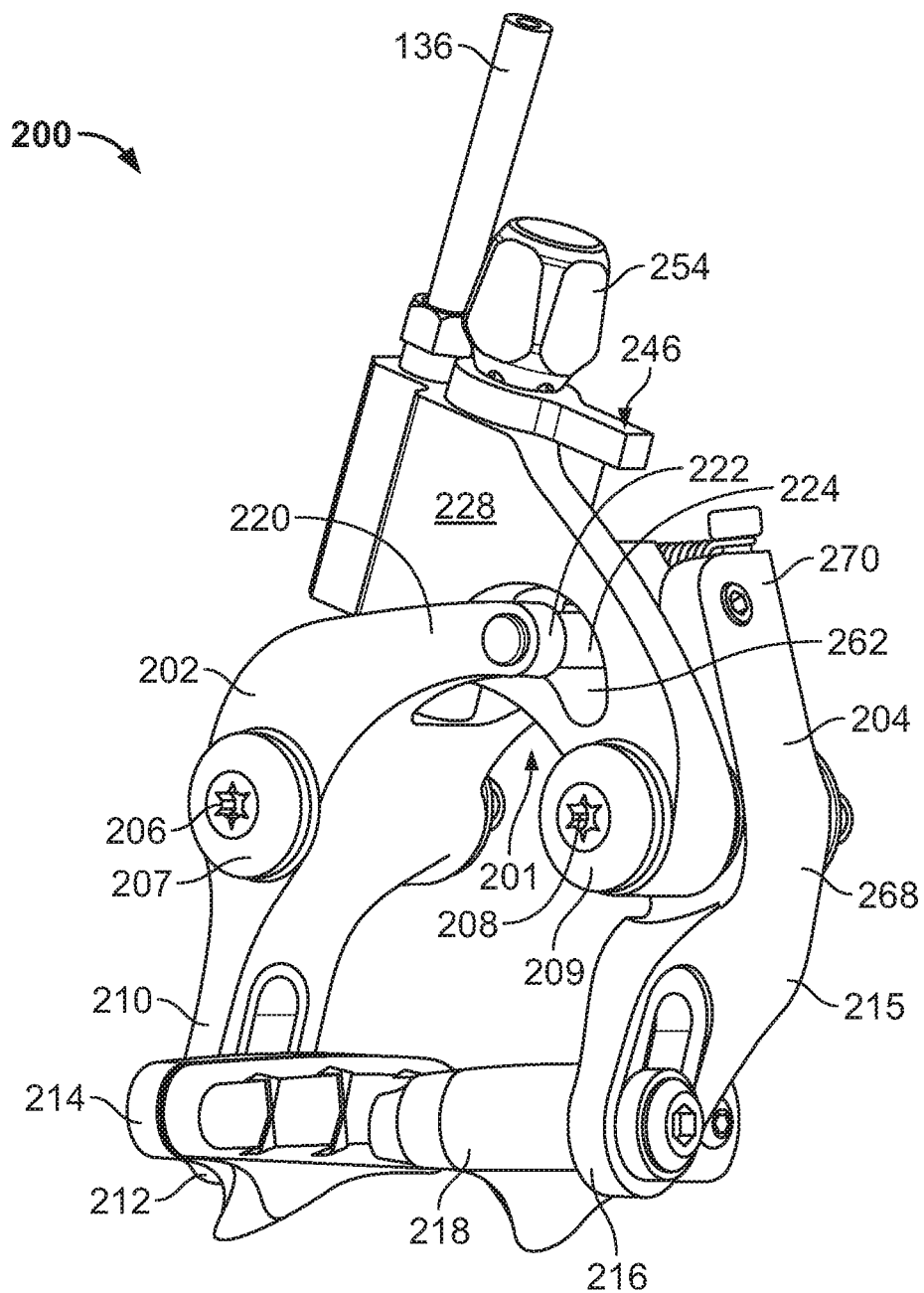
FIG. 2 is a perspective view of a rim brake according to one embodiment.
Figure 3:
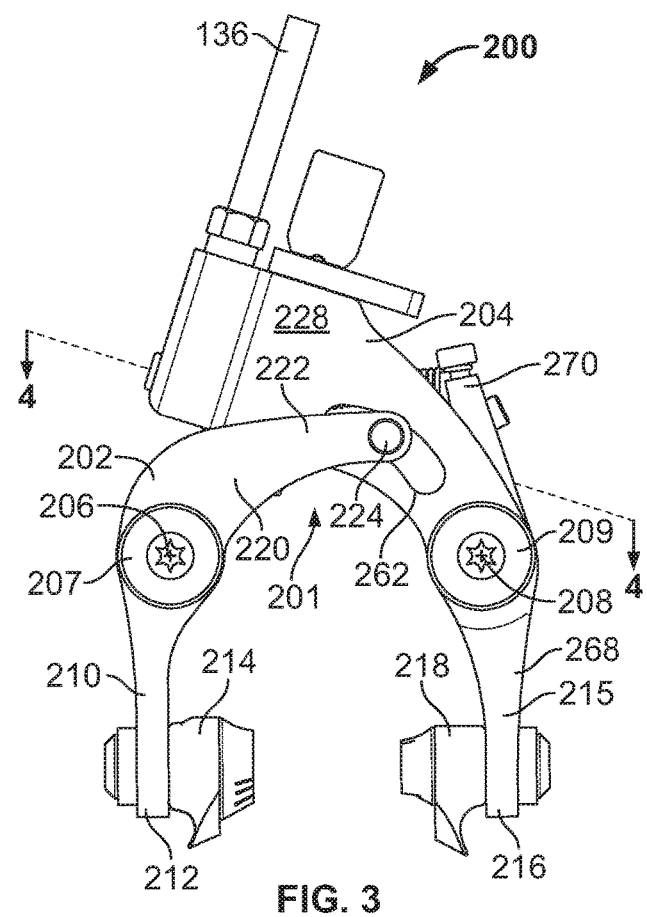
FIG. 3 is a front view of the brake shown in FIG. 2.

FIG. 1 is an elevational view of a bicycle indicated generally at 100, which may be used to implement rim brakes disclosed herein. While the illustrated bicycle is a road bike, the brakes may be employed on any bicycle using one or more rim brakes, including touring bicycles, commuter bicycles, mountain bikes, cyclocross bikes and triathlon bikes. Bicycle 100 has a frame 102 that includes a head tube 104 and left and right seat stays (right seat stay 106 being shown). A fork 108 rotates within the head tube 104. The fork 108 rotatably mounts a front wheel 110 to the rest of the bicycle 100. Front wheel 110 has an axis 112 and a wheel rim 114. The wheel rim 114 has a rim sidewall or other annular braking surface 116 against which a brake pad (described below) may be employed. The annular braking surface 116 is disposed at a predetermined radius from the wheel axis 112. A front rim brake 118 may be hand-actuated by a user to apply frictional force to opposed annular braking surfaces 116. The front rim brake 118 is mounted to the fork 108 on left and right axial mounts in a manner which will be described below.

In the illustrated embodiment, a rear wheel 120 is rotatably mounted to the rest of the bicycle 100 at the junction of its seat stays and chain stays, right chain stay 121 being shown. The rear wheel 120 has a rear wheel axis 122 and a rim 124. Sidewall or other opposed annular braking surfaces 126 of rim 124 are a predetermined radius away from the rear wheel axis 122. The radii of wheels 120 and 110 typically are the same but don't have to be. Further, while a diamond frame 102 that includes both chain stays and seat stays is illustrated, some frame designs omit the seat stay or replace it with more elaborate shock-absorbing apparatus, and brake(s) disclosed herein may be used in conjunction with these other frame types.

Figure 5:
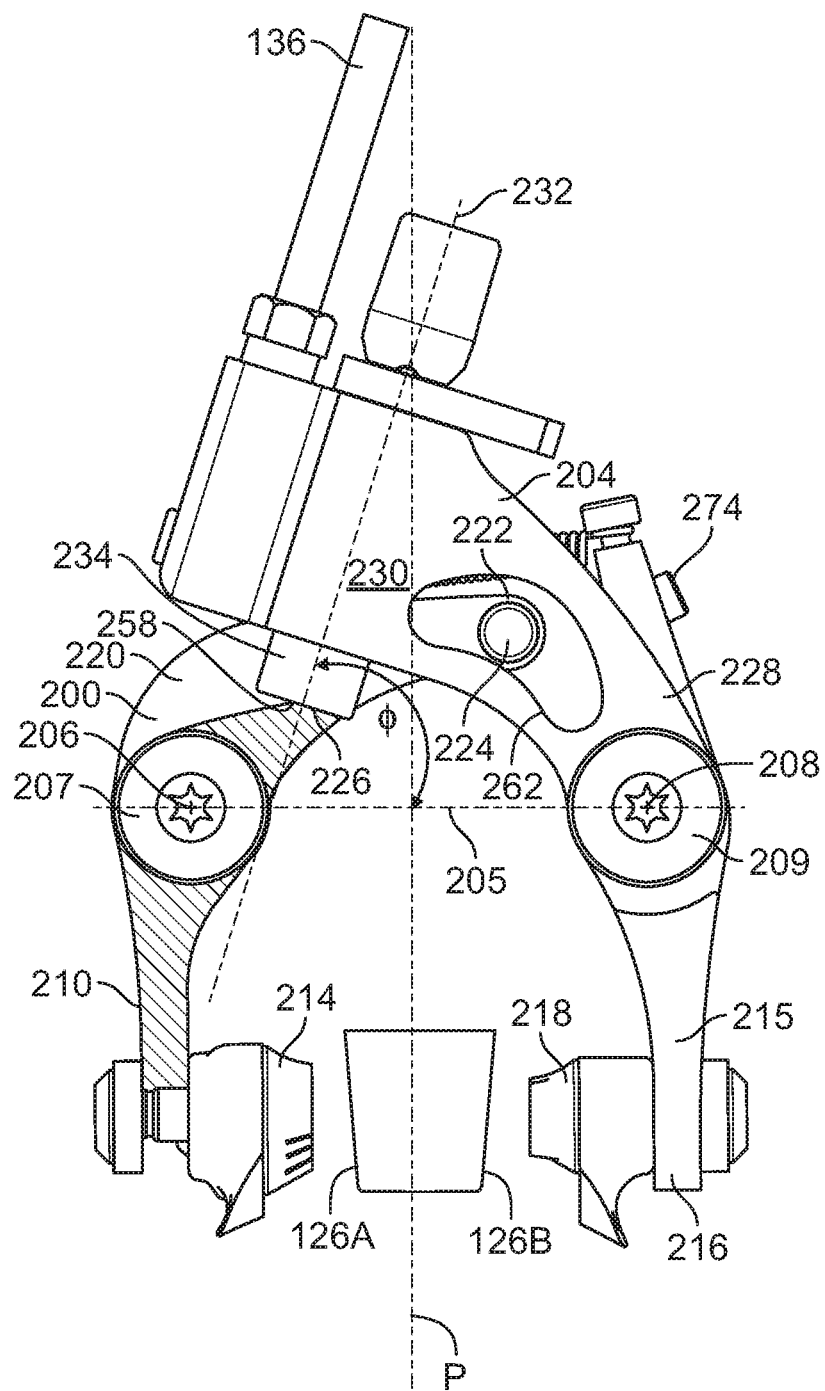
FIG. 5 is part-sectional view of the brake shown in FIG. 3, diagramming certain spatial relationships.
Figure 6:
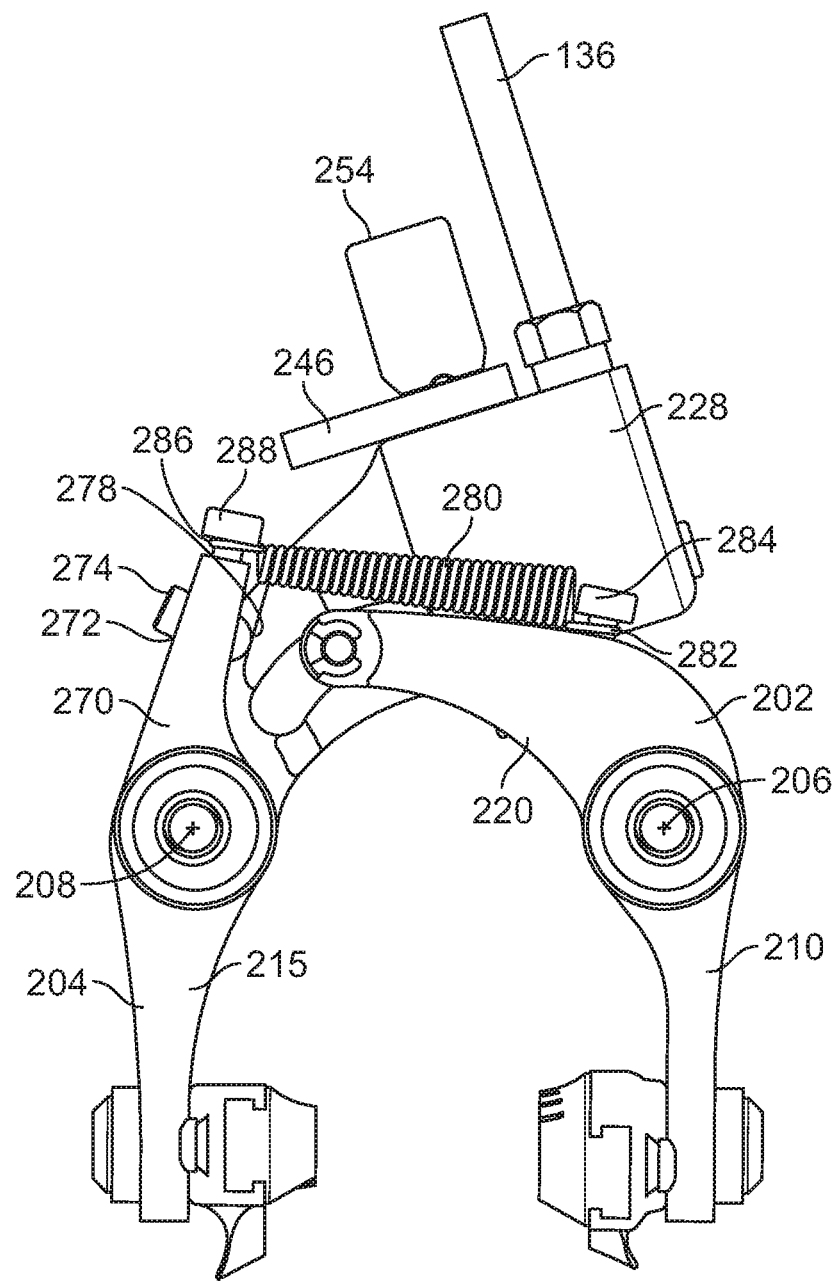
FIG. 6 is a back view of the brake shown in FIG. 2.

In the illustrated embodiment, a rear rim brake 128 is mounted on dual posts (not shown in the FIG. 1) that are in turn formed on the left and right seat stays of the frame 102. In other embodiments, the rear rim brake 128 may be mounted elsewhere on the frame 102 to be adjacent the rear annular braking surfaces 126, such as on a seat tube 130 of frame 102. The rim brake 200 described below may be employed as a front rim brake 118, a rear rim brake 128 or both. Unless it is being steered left or right, in use bicycle 100 occupies, and moves in, a vertical center plane P (FIG. 5).

A handlebar 132 rotates as a unit with fork 108. In one conventional arrangement, mounted on the handlebar are two hand-operated brake levers (rear brake lever 134, as typically mounted on the right side of handlebar 132, being shown) that are operated by the user to actuate the brakes 118, 128. In the embodiment illustrated in FIGS. 2-14, the brakes 118, 128 are hydraulic brakes, each of which incorporate a piston within a slave cylinder (described below) that moves responsive to the pressure of hydraulic fluid. As applied to hydraulic embodiments, brake lever 134 has a master piston and cylinder (not shown) incorporated within it and is connected by a hydraulic brake line 136 to rear brake 128. Similarly, the left brake lever has a master piston and cylinder located within it, and is connected by a hydraulic brake line 138 to the front brake 118. An increase in the fluid pressure of line 136 will cause the piston (described below) in the slave cylinder in brake 128 to move along the cylinder axis, causing brake 128 to clamp against annular braking surface 126. An increase in the fluid pressure of line 138 will cause the piston in the slave cylinder in brake 118 to move along the cylinder axis, causing brake 118 to clamp against annular braking surfaces 116.

In another embodiment, the hydraulic brake lines or hoses 136, 138 are replaced by Bowden cables, which exert a rider-varied degree of tensile force on cable-actuated rim brakes to which they are connected. A cable-actuated embodiment will be described below.

FIGS. 2-14 illustrate one hydraulic brake according to one embodiment. A brake indicated generally at 200 has a first brake arm 202 and a second brake arm 204. In the view shown in FIG. 3, and as mounted on mounts of a pair of seat stays (not shown), the first brake arm 202 is the left brake arm and the second brake arm 204 is the right brake arm, although the entire structure can be easily reversed in mirror image.

First brake arm 202 is pivotably attached to a first brake mount (not shown) on a first pivot or first axis 206 by suitable fasteners 207. Second brake arm 204 is pivotably attached to a second brake mount (not shown) by suitable fasteners 209 on a second pivot or second axis 208. Fasteners 207, 209 can each include a shaft and bushings. The first axis 206 is parallel to the center plane P and is a predetermined distance from plane P in a left outboard direction (FIG. 5). The first axis 206 further is tangential to a vertical radius drawn from the bicycle wheel axis (112 or 122) with which it has been associated. The second axis 208 is likewise parallel to the center plane P and is spaced from it in a right outboard direction that that is equal to the spacing of first axis 206 from plane P (FIG. 5). The first axis 206 is horizontally displaced from the second axis 208 such that a horizontal reference line 205 extends therebetween (FIG. 5). The axis 208 further is tangential to a vertical radius drawn from the bicycle wheel axis (112 or 122) with which it has been associated.

First brake arm 202 has a "downwardly" depending first brake pad holder 210 having an end 212 that is displaced from first axis 206 toward wheel axis 112 or 122. It should be understood that as used herein and as describing the structure of the different brake embodiments described herein, the words "downward", "downwardly", "lower", "upward", "upwardly" and "upper" all refer to a radial distance towards or away from wheel axis 112 or 122, depending on where the brake is installed and which wheel 110, 120 the brake is meant to brake; as installed, the brake first and second axes 206, 208 will often be at a considerable angle to the horizontal. A brake pad 214 is affixed to the end 212 so as to reside within an arc (around first axis 206) that intersects an annular braking surface 126A of rear wheel 120 (while the use of brake 200 as braking the rear wheel 120 is shown in particular in FIGS. 2-13, the description also applies to brake 200 being used as a front brake to brake wheel 110). Likewise, second brake arm 204 has a downwardly depending brake pad holder 215 with an end 216 that is displaced from axis 208 toward wheel axis 122. A brake pad 218 is affixed to the end 216 so as to reside within an arc (around axis 208) that intersects the opposed annular braking surface 126B of wheel 120.

The brake 200 includes a force transfer mechanism 201 between the first and second brake arms 202, 204 configured to move the first pad holder 210 in the first arcuate direction about the first pivot 206 as the piston advances. The force transfer mechanism 201 includes first and second force transfer members 220, 228. The first brake arm 202 has the first force transfer member 220 which, in this embodiment, extends in an inboard and upward direction to an end 222. In this illustrated embodiment, a contact surface such as a roller 224 is affixed to the transfer member end 222 along an axis which is parallel to first axis 206. The first brake arm 202 further has a piston cam surface 226 that is disposed in an inboard and upward direction from the first axis 206. The piston cam surface 226 is convexly arcuate relative to first axis 206. The piston cam surface 226 may be disposed forwardly from the transfer member end 222; in an alternative embodiment the transfer member end 222 may be disposed forwardly from the piston cam surface 226. In the illustrated embodiment, the transfer member 220 and the piston cam surface 226 are integrally formed as by machining and/or molding and adjoin each other. Transfer member 220, first brake pad holder 210 and piston cam surface 226 freely rotate around the first axis 206 as a unit.

The second brake arm 204 has the second force transfer member 228 that extends upwardly and in an inboard direction from the second axis 208. The second force transfer member 228 includes a piston housing or cylinder 230 formed along a piston axis 232. In the illustrated embodiment the piston axis 232 rotates around second axis 208 as the brake 200 is being actuated. Nonetheless, throughout its range of motion, the piston axis 232 remains inboard from the first axis 206. The piston housing 230 may be mostly or completely located on the other side of center plane P relative to second axis 208.

Figure 4:
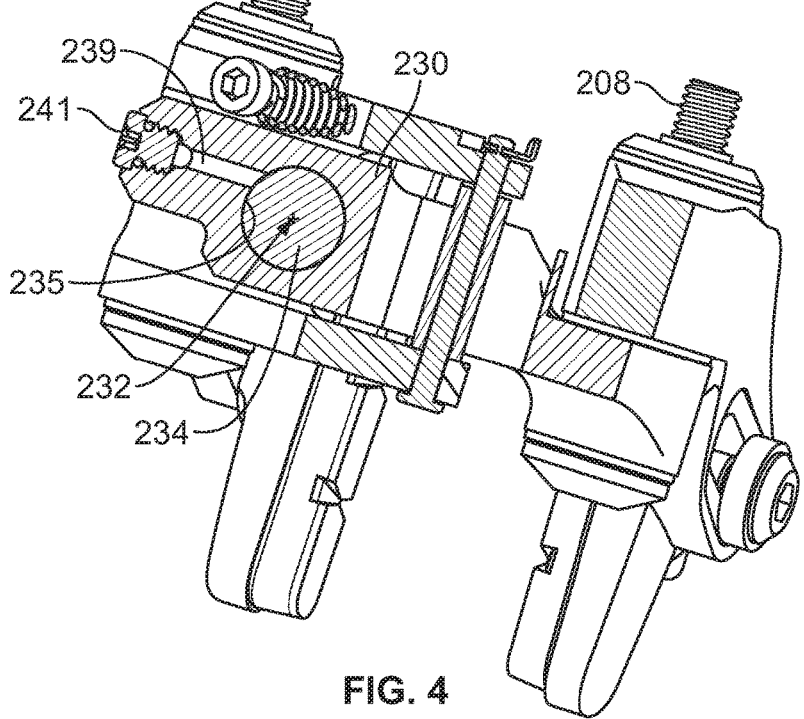
FIG. 4 is a sectional view taken substantially along line 4A-4A of FIG. 3.
Figure 7:
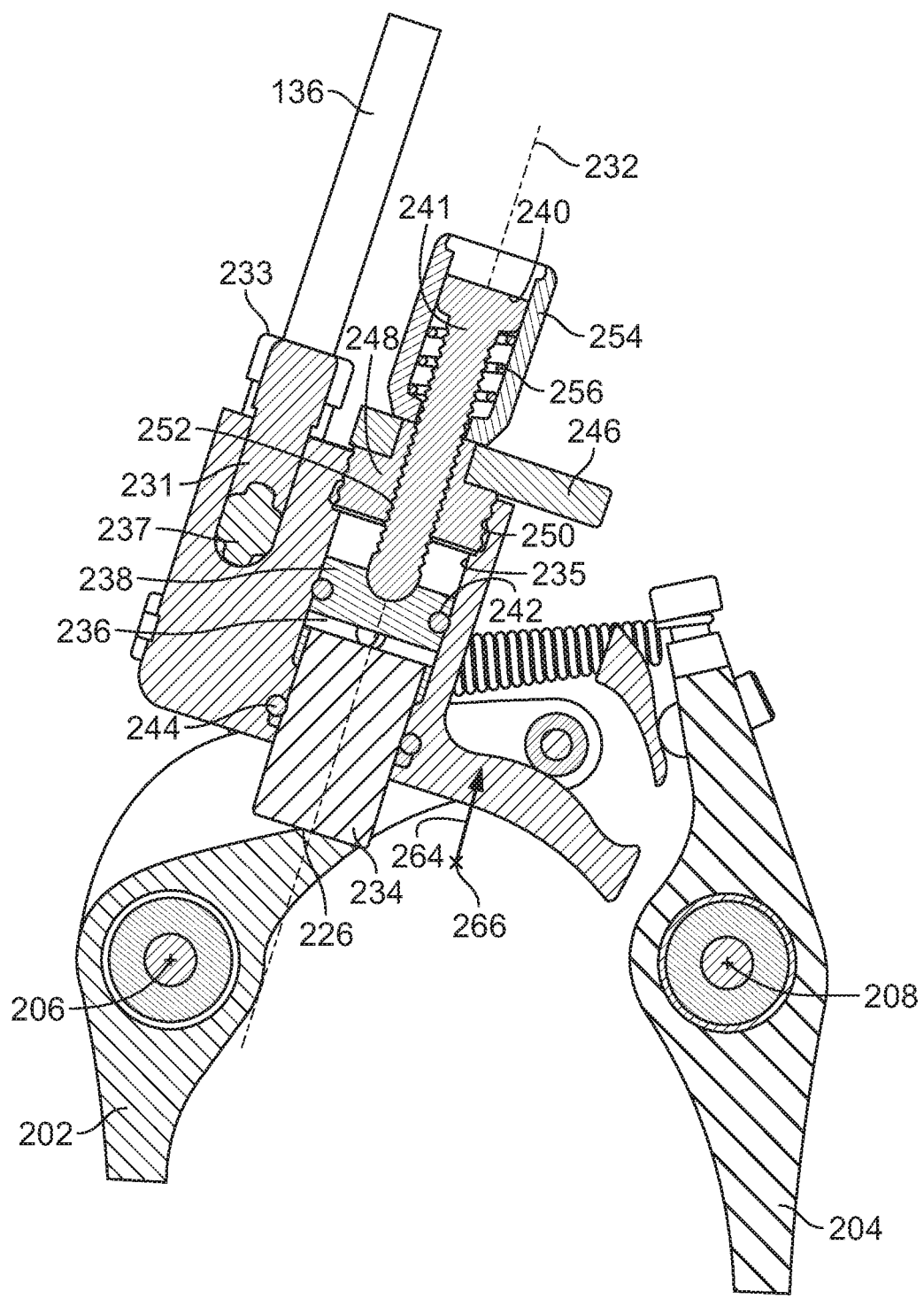
FIG. 7 is a transverse sectional view of the brake shown in FIG. 3, the section taken substantially orthogonally to a center plane.
Figure 9:
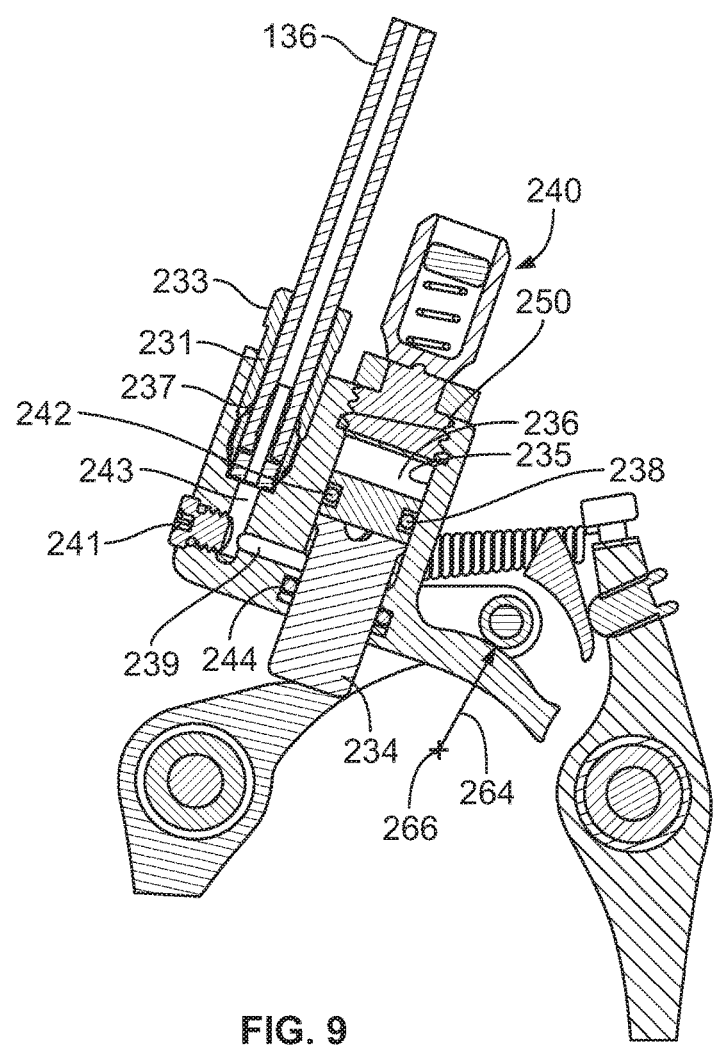
FIG. 9 is a transverse sectional view of the brake shown in FIG. 3, the sectional plane being parallel to the sectional plane of FIG. 7.
Figure 11:
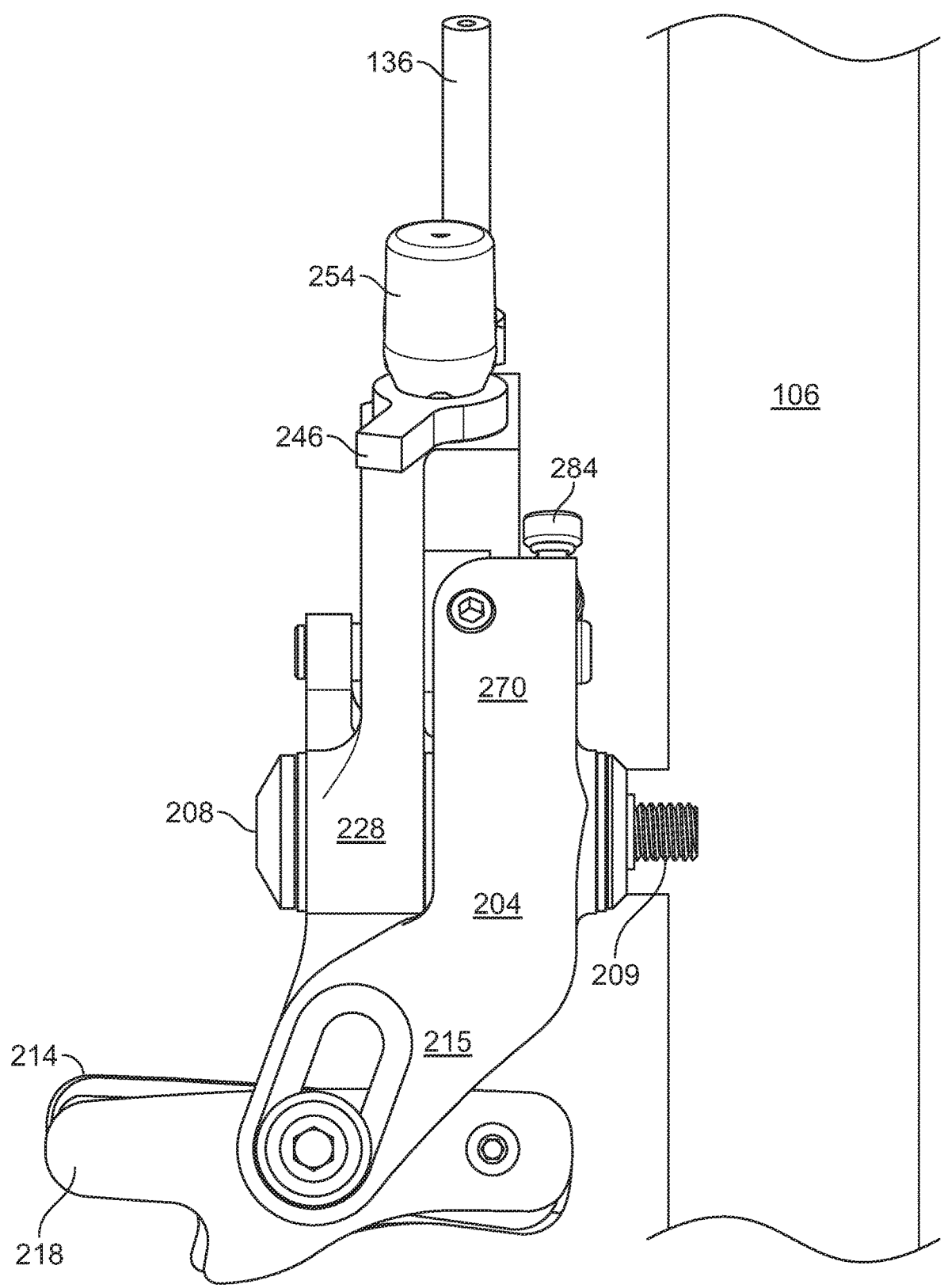
FIG. 11 is a right side view of the brake shown in FIG. 2 and representative structure of a bicycle frame to which the brake is mounted.
Figure 12:
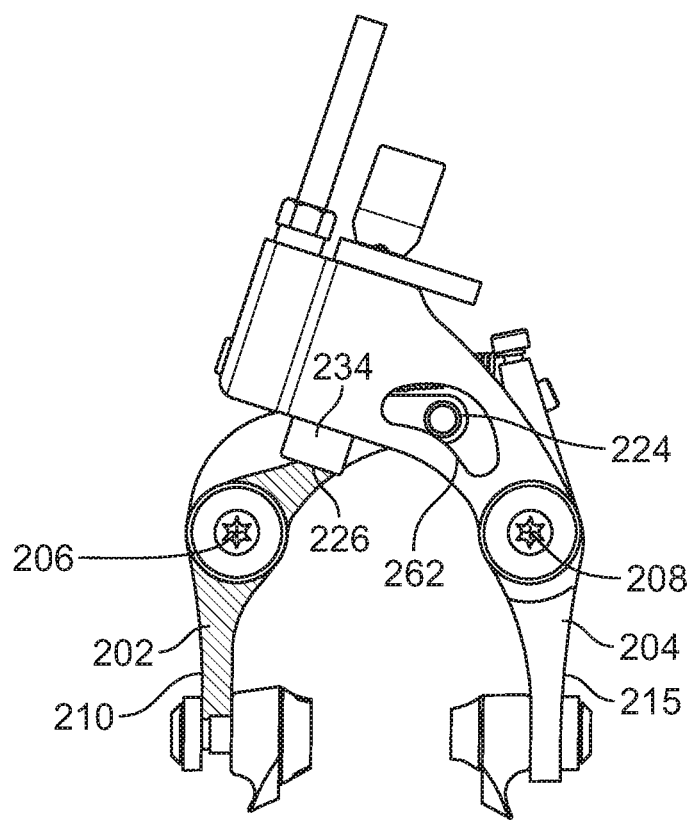
FIG. 12 is a part-sectional front view of the brake shown in FIG. 3, in a non-actuated condition.
Figure 13:
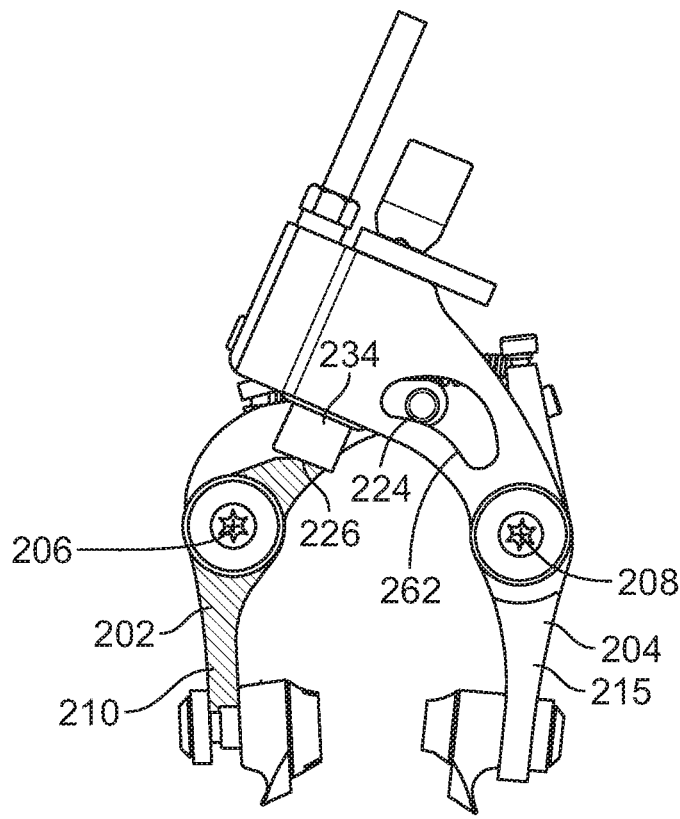
FIG. 13 is a part-sectional front view of the brake shown in FIG. 3, but shown in an actuated condition.
Figure 14:
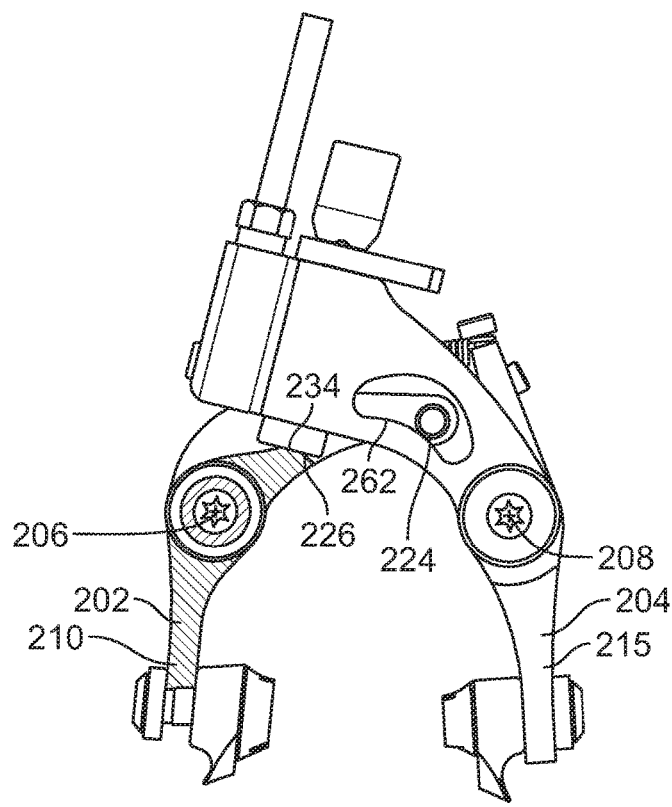
FIG. 14 is a part-sectional view of the brake shown in FIG. 3, but shown in an open condition.

As particularly seen in FIGS. 7 and 9, a slave piston 234 slides within a cylinder 235 defined by the piston housing 230 along piston axis 232. The piston 234 extends downwardly out of piston housing 230 responsive to an increase in fluid pressure in hydraulic hose or line 136. An end of hose 136 is inserted into a chamber 231 and is fixed in place with the aid of a nut 233 and a compression fitting 237. The fluid within hose 136 and chamber 231 is in fluid communication with hydraulic fluid within chamber 236 via passages 243 and 239. The position of a piston stop 238 is set by a threaded barrel adjuster 240. The piston stop 238 has an annular seal 242, and the piston 234 has an annular seal 244, both engaging cylindrical sidewall 235 and acting to contain the pressurized hydraulic fluid within hydraulic chamber 236. A lower surface of the piston stop 238 defines the upper limit of slave piston 234, as will obtain when the brake pad holders are in their open position (FIG. 14). The cylinder 235 further is ported via passage 239 to a hydraulic fluid bleed port 241 (FIG. 4).

In the illustrated embodiment, the piston stop 238 may be advanced down or retracted up the piston axis 232 by one of two adjust mechanisms of a barrel adjuster 240. A coarse adjust or "quick release" lever 246 rotates as a unit with a quick release stop 248. Quick release stop 246 has relatively coarse threads which engage with a threaded upper bore 250 of the piston housing 230. An inner bore 252 of the quick release stop 248 has relatively fine threads which threadedly engage with the shaft of a micro adjust rod 241. When a user rotates the quick release lever 246, the quick release stop and the micro adjust rod 241 will rotate with it as a unit, quickly advancing or retracting the piston 234 up or down the cylinder 235, and quickly opening or closing the brake pads, as might be desired for removal and reinstallation of the wheel 120.

The brake pad gap relative to the wheel rim or annular braking surfaces 126 is set by twisting a barrel adjust housing 254 relative to the brake quick release lever 246. Barrel adjust housing 254 turns as a unit with micro adjust rod 241, and will advance or retract rod 241 relative to the quick release stop 248. A helical spring 256 places tensile force between the inner bore 252 of the quick release stop 248 and the barrel adjust housing, reducing or preventing undesired relative movement of these components.

Figure 8:
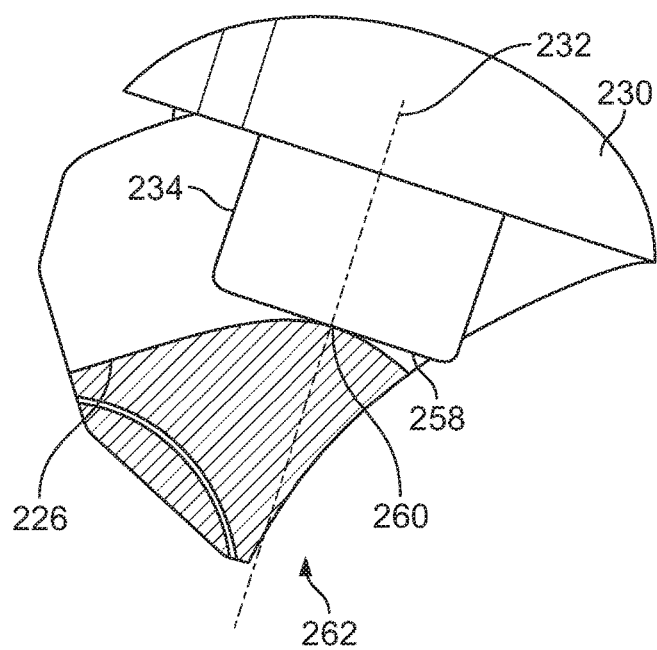
FIG. 8 is a detail of FIG. 7 showing structure of a piston cam surface.

As best seen in FIG. 8, piston 234 terminates at its lower end with a piston contact surface 258. In the illustrated embodiment this contact surface 258 is a flat disk. Piston contact surface 258 meets the piston cam surface 226 at a line of contact 260 that stays in alignment with the piston axis 232. The convexly arcuate shape of piston cam surface 226 is preselected so that the piston axis 232 goes through the line of contact 260 throughout the range of stroke of the piston 234. In an alternative embodiment (not shown), the contact surface 258 or the piston cam surface 226 may be replaced with a roller.

The second force transfer member 228 of the second brake arm 204 further has, formed on or within it, a second contact surface, such as a transfer cam surface 262. In the illustrated embodiment the transfer cam surface 262 is located in an upper and inboard direction from the second axis 208, but is displaced somewhat downwardly from the piston housing 230 so as to be intermediate the piston housing 230 and the second axis 208. In one embodiment, the position and shape of the transfer cam surface 262 are selected such that the speed with which brake pad 214 moves toward or away from rim 126A equals the speed with which brake pad 218 moves toward or away from the opposed rim 126B; the brake pads 214, 218, and the arms 202, 204 to which they are attached, are then said to move synchronously. For synchronous movement, it has been discovered that the shape of transfer cam surface 262 can be nearly circularly cylindrical. In the illustrated embodiment, the synchronizing transfer cam surface 262 has a radius 264 from a center 266 that is located inboard from first and second axes 206 and 208. The center 266 is located downwardly from the transfer cam surface 262. In an alternative embodiment, the roller 224 may be replaced with a cam surface (not shown) that slides on transfer cam surface 262. In a still further embodiment (not shown), the first brake arm 202 may be fitted with a cam surface and the second brake arm with a roller, opposite the arrangement shown.

In this illustrated embodiment, the second brake arm 204 is split into two parts: the second brake arm force transfer member 228, and a biasing member or portion 268 that includes brake pad holder 215 and a centering adjust body 270 that extends upwardly from the second axis 208. Both portions 228 and 268 are rotatably mounted to second axis 208. A threaded bore 272 in the centering adjust body 270 is disposed upwardly from the axis 208 and accepts a centering member such as a set screw 274. An end 276 of the set screw 274 abuts a surface 278 of the transferring member 228. As set screw 274 is advanced into bore 272, the centering adjust body 270 angularly displaces relative to transferring member surface 278. As a result, brake pad holder 215 will move in an inboard direction, but brake pad holder 210 will not. Set screw 274 can be rotated in an opposite direction to open brake pad holder 215 relative to brake pad holder 210. This provides an ability to center the brake pads 214, 218 around the wheel rims or annular braking surfaces 126A, B.

In this embodiment, the arm 202 is biased against arm 204 by a helical return spring 280. A first end 282 of the return spring is attached to a post 284 on the first brake arm 202. A second end 286 of the return spring is attached to a post 288 on an end of the centering adjust body 270. Spring 280 urges together posts 284 and 288. Therefore, on the other side of the axes 206, 208, the brake pad holders 210, 215 are biased to an open or retracted condition. The coil spring 280 also acts to urge the end 276 of the set screw 274 against surface 278 of the transferring member 228 of the second brake arm 204, causing the second brake arm components 228 and 268 to rotate as a unit around second axis 208.

In operation and referring to FIG. 5, a rider squeezes a brake lever (such as rear brake lever 134) on the handlebar 132 (see FIG. 1), causing a master cylinder therein (not shown) to put pressure on hydraulic fluid within hydraulic brake line 136. This causes the slave piston 234 to downwardly extend from the piston housing 230 on the second brake arm 204. The lower contact surface 258 of the piston 234 stays abutted against the piston cam surface 226 of the first brake arm 202. Extension of the piston 234 causes second brake arm 204 to rotate around second axis 208, and causes the second brake pad holder 215 to rotate in an inboard direction, eventually contacting an annular braking surface 126B of the wheel.

As this motion is occurring, the transfer cam surface 262 is lifting the roller 224 upward and leftward. This causes rotation of the first brake arm 202 around first axis 206. In the illustrated embodiment, the shape of the transfer cam surface 262 ensures that the movement of brake pad holders 210, 215 are "synchronous", that is, that they move at the same rotational speed around axes 206, 208 but in opposite angular directions. Since the brake pads 214, 218 are at the same radius from their respective axes 206, 208, they will also move, in opposed directions, at the same tangential speed.

FIGS. 10A-10B show force vectors operating on the various components of the brake. $F_b$ is the brake force, or the pad force operating on the annular braking surfaces 126A, 126B to generate stopping power. $F_f$ is a frame force, acting on the frame or fork mounts and orthogonal to pivot axes 206, 208. $F_p$ is the non-horizontal force of the piston 234; an equal and opposite force between the piston 234 and the piston cam surface 226. $F_r$ is a roller force; an equal and opposite force between the roller 224 and transfer cam surface 262. Φ is the angle relative to the horizontal at which forces $F_p$ and $F_r$ act (see FIG. 5). The ratio of $F_p/F_b$ may be less than 2.5. Preferably, the ratio of $F_p/F_b$ may be less than 2.0. More preferably, the ratio of $F_p/F_b$ may be less than 1.5. One technical advantage is that the piston force $F_p$ is spread among the roller force $F_r$ and the frame forces $F_f$ rather than just the frame forces $F_f$ alone. This reduces loading on the brake mounts, creates a stiffer feel in actuating the brake, and lowers frame/fork mount strength requirements.

Figure 15:
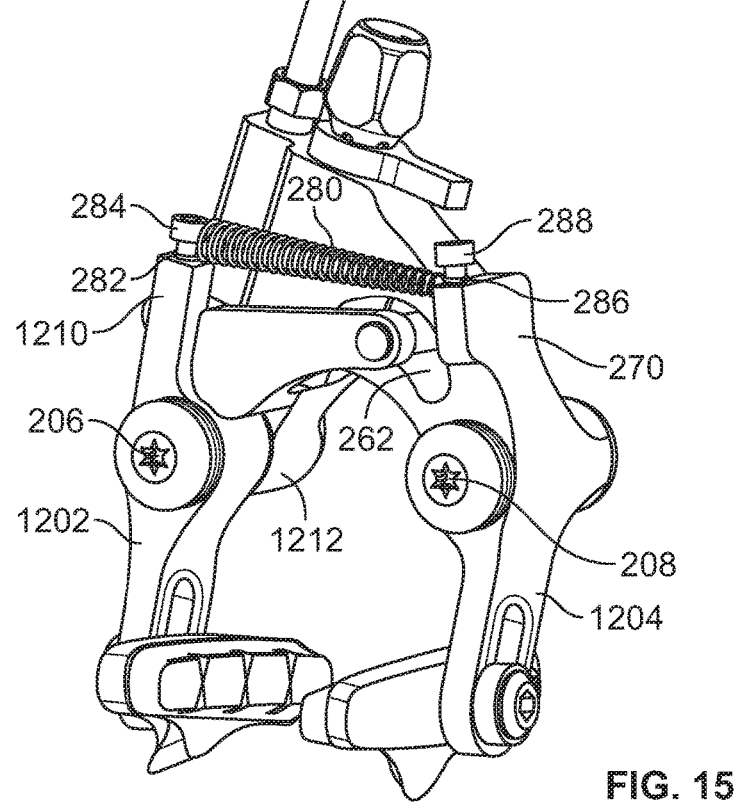
FIGS. 15 and 16 are perspective and front views of an alternative embodiment in which a centering adjust is on a different brake arm.
Figure 16:
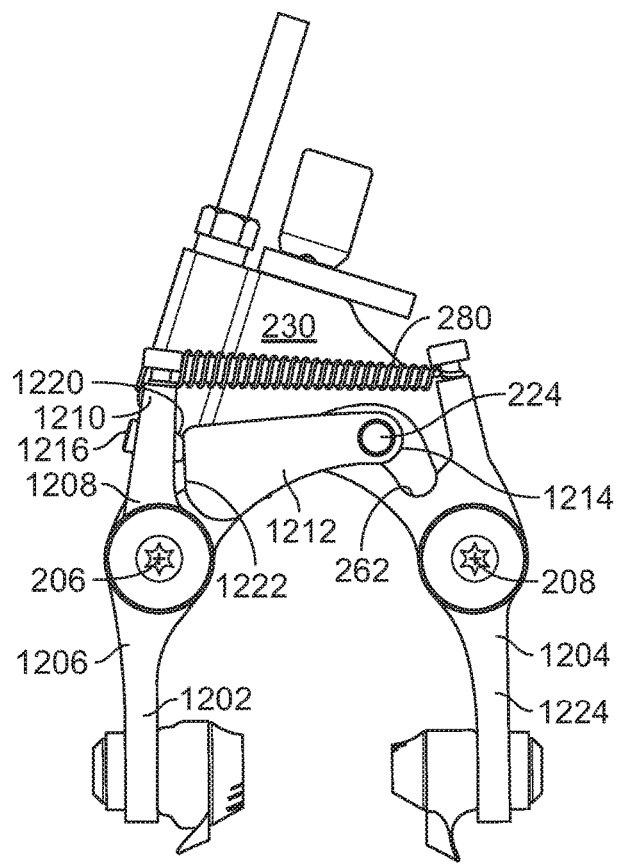

An embodiment alternative to the one shown in FIGS. 2-14 is shown at 1200 in FIGS. 15 and 16. In this embodiment, a first brake arm 1202 is rotatably mounted at axis 206 to a bicycle fork or frame member, and a second brake arm 1204 is rotatably mounted to a fork or frame member at axis 208, as before. But the centering adjust mechanism has been moved from second brake arm 1204 to first brake arm 1202. The first brake arm 1202 has a downwardly depending brake pad holder 1206. An upwardly extending biasing member 1208 is integral with brake pad holder 1206 and rotates with holder 1206 around axis 206 as a unit. An upper end 1210 of the biasing member 1208 has a post 284 thereon that receives first end 282 of the coil return spring 280. A force transfer member 1212 of the first brake arm 1202 is now split from the brake pad holder 1206 and may rotate around axis 206 independently of it. The transfer member 1212 continues to carry a contact surface such as cam roller 224 on its remote end 1214.

A centering adjust set screw 1216 is threadedly received into a bore 1218 in the biasing member 1208. A front end 1220 of the set screw 1216 contacts a surface 1222 of the force transfer member 1212. Rotating the set screw clockwise or counterclockwise will change the angular separation of the brake holder 1206 relative to the force transfer member 1212, thus permitting a centering adjustment of the brake 1200.

The second brake arm 1204 is no longer split. A brake pad holder 1224 of the second brake arm 1204 is integral with a force transfer member 1226 thereof. The force transfer member 1226 contains the transfer cam surface 262 and the piston housing 230.

Figure 17:
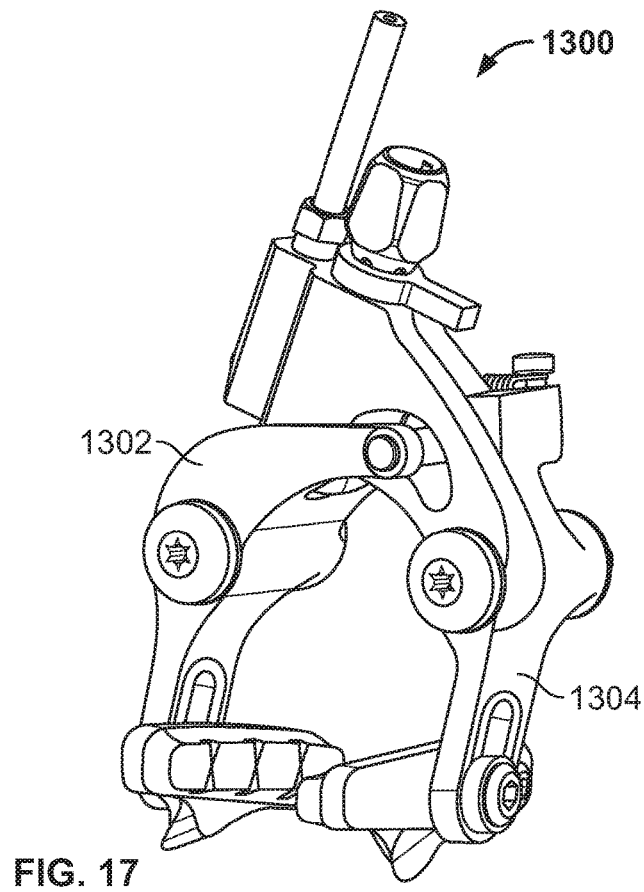
FIG. 17 is a perspective view of an alternative embodiment having no centering adjust.

A further embodiment is shown in FIG. 17. This brake 1300 is similar to brake 200 (FIGS. 2-14) but has no centering adjust mechanism at all. The first brake arm 1302 and the second brake arm 1304 are not split.

Figure 18:
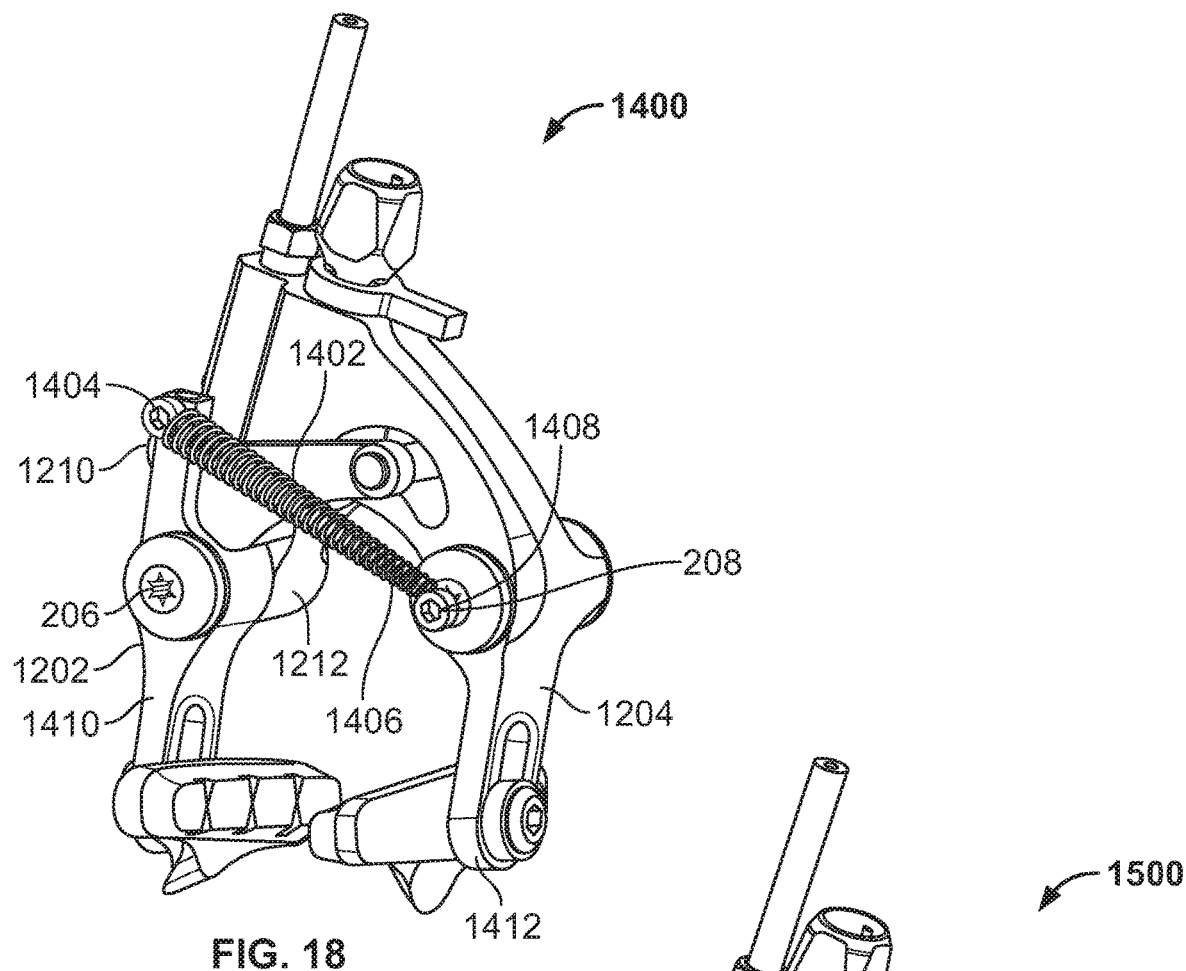
FIG. 18 is a perspective view of an alternative embodiment in which one end of a coil return spring is attached to a brake mount.

The embodiment 1400 shown in FIG. 18 is similar to the one shown in FIGS. 15 and 16, but the connections of a return spring 1402 are different. A first end 1404 of a helical return spring 1402 is connected to an end 1210 of the first brake arm 1202. A second end 1406 of the return spring 1402 is affixed to a fastener 1408 that is coaxial with second axis 208. In this position, the return spring 1402 continues to urge brake pad holders 1410, 1412 apart and continues to urge spit members 1212 and 1410 together.

Figure 19:
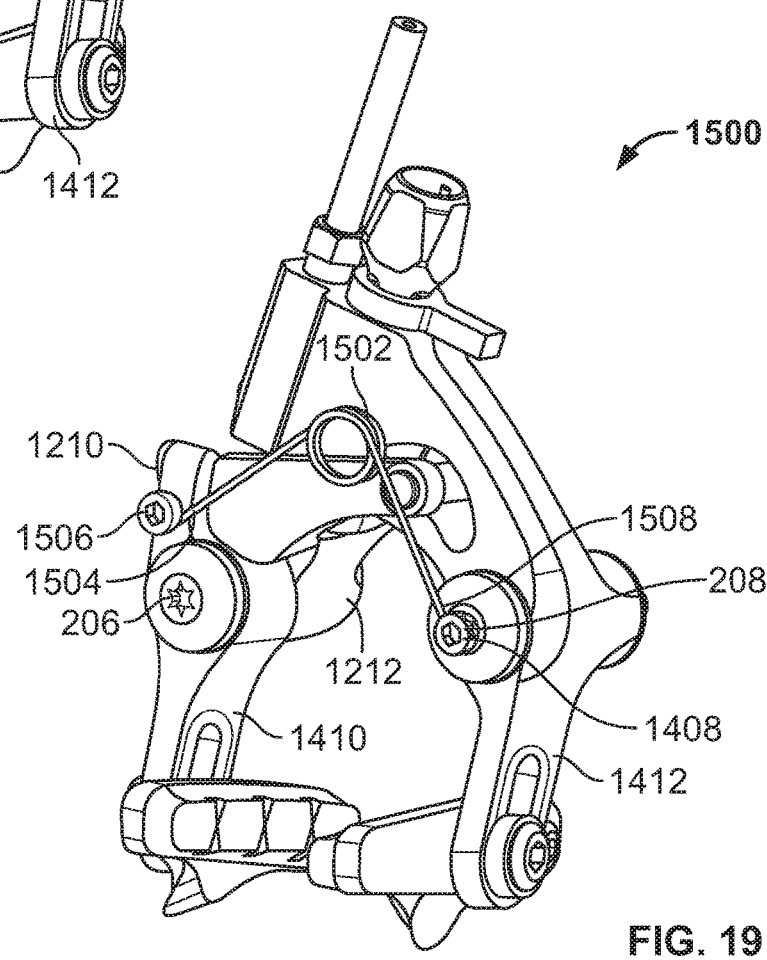
FIG. 19 is a perspective view of an alternative embodiment in which the bias member is a torsion spring.

FIG. 19 illustrates another embodiment 1500 that generally is similar to brake 1200. But in place of helical spring 1402 (FIG. 18), a torsion spring 1502 is used. A first end 1504 of the torsion spring 1502 is affixed as by a fastener 1506 to biasing member end 1210. A second end 1508 of torsion spring 1502 is affixed as by fastener 1408 to be coaxial with the second axis 208.

Figure 20:
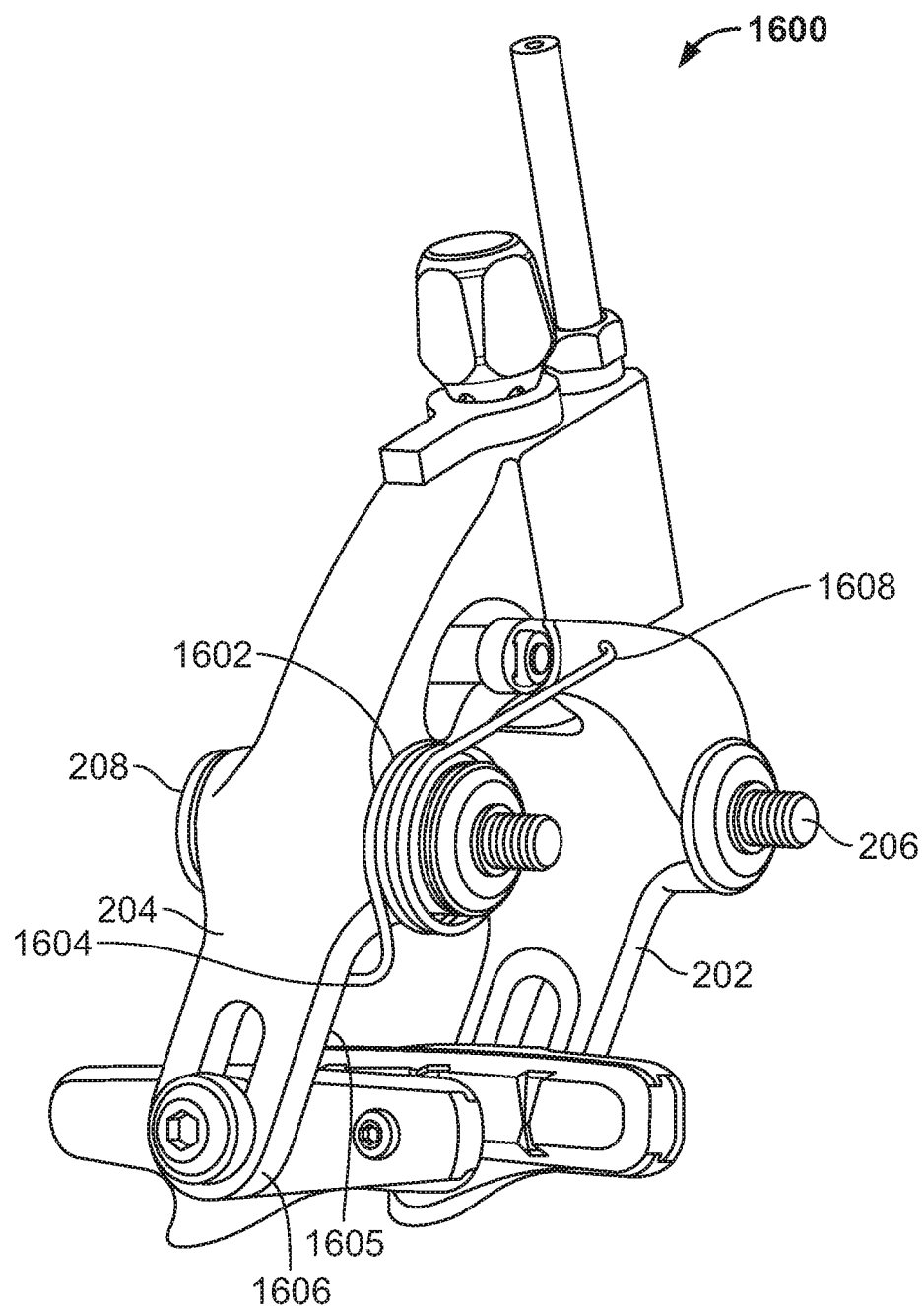
FIG. 20 is a perspective view of an alternative embodiment including a torsion return spring wound around a brake mount.

FIG. 20 shows an embodiment 1600 in which the spring member 1602 is constituted by a torsion spring that is wound around second axis 208. A first end 1604 of the torsion spring 1602 is positioned to abut an interior surface 1605 of the brake holder 1606 of the second brake arm 204. A second end 1608 of the torsion spring 1602 is joined to the first brake arm 202.

Figure 21:
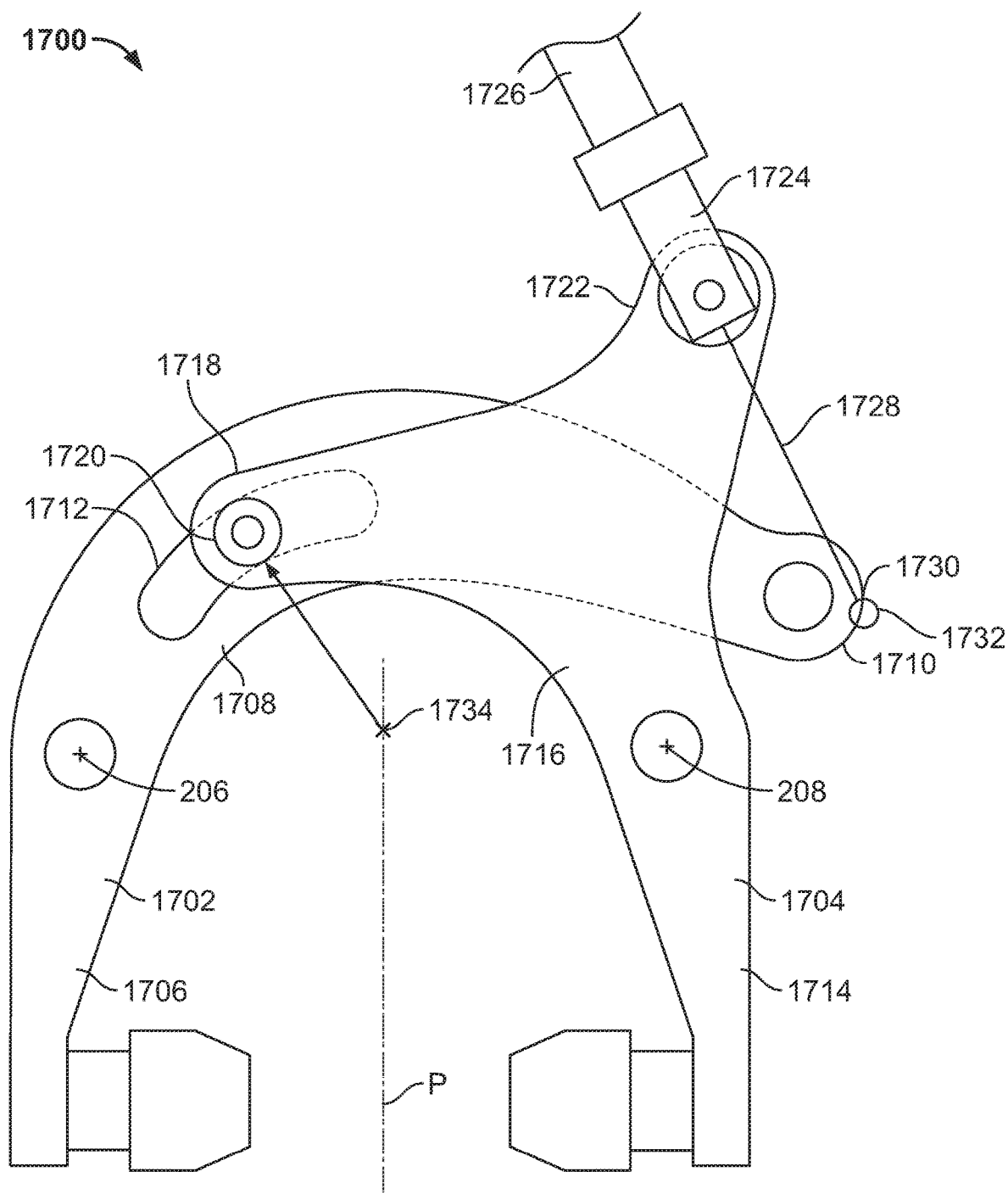
FIG. 21 is a front view of a cable pull embodiment.

A cable pull embodiment 1700 is illustrated in FIG. 21. A first brake arm 1702 rotates as a unit around a first axis 206. A second brake arm 1704 rotates as a unit around second axis 208. The first brake arm has a first brake pad holder 1706 that downwardly depends from the axis 206. A force transfer member 1708 is formed to be integral with the pad holder 1706 and extends inwardly, past center plane P, to an end 1710 that in the illustrated embodiment is positioned outboard and upward from second axis 208. A contact surface, such as an arcuate roller cam surface 1712, is formed by the force transfer member 1708.

The second brake arm 1704 has a second brake pad holder 1714 that downwardly depends from second axis 208. A force transfer member 1716 upwardly and inwardly extends from the second axis 208 and is integrally formed with the second brake pad holder. In other embodiments, and in order to provide a centering adjust mechanism as has been described in conjunction with other embodiments, brake pad holder 1706 may be split from transfer member 1708, or brake pad holder 1714 may be split from transfer member 1716, and a set screw (not shown) or other centering member may be used to set the angular relationship between the split members.

An end 1718 of the force transfer member 1716 has a contact surface such as a roller 1720 which engages with the roller cam surface 1712 of the force transfer member 1708. Transfer member 1716 further has an upwardly extending lobe 1722 that is positioned to be on the same side of the center plane P as is end 1710 of the transferring member 1708. A terminating fitting 1724 of a Bowden cable housing 1726 is pivotally affixed to the lobe 1722. A brake cable 1728 that is threaded through the housing 1726 of the Bowden cable has an end 1730 that is pivotally attached to end 1710 by a suitable fastener 1732.

In the operation of this embodiment, the rider operates a hand lever located on the handlebar of the bicycle (not shown), creating tensile force on the cable 1728. This will urge cable 1728 upward and into housing 1726. Cable 1728 will draw transfer member end 1710 toward lobe 1722. Tensile force on cable 1728 will also cause the arm 1702 to rotate as a unit around axis 206, inwardly pivoting first brake pad holder 1706.

As this is happening, the roller cam surface 1712 lifts roller 1720 and therefore the end 1718 of the transfer member 1716. This will cause the second brake arm 1704 to rotate, in an opposite direction, around axis 208, pivoting second brake pad holder 1714 in an inboard direction.

The motion of brake pad holders 1706, 1714 may be synchronized by correctly choosing the shape of the roller cam surface 1712. In this illustrated embodiment, the synchronizing roller cam surface 1712 describes a circular arc around a center 1734 that is downward and inboard from the surface 1712.

The embodiments herein described have the technical advantage of producing linear actuation rates.

Numerous modifications to the embodiments disclosed herein will be apparent to those skilled in the art in view of the foregoing description. For example, any of the embodiments disclosed herein may be modified to include any of the structures or/and methodologies disclosed in connection with different embodiments. Accordingly, this disclosure is to be construed as illustrative only and is presented for the purpose of enabling those skilled in the art to make and use the invention and to teach the best mode of carrying out same. The exclusive rights to all modifications which come within the scope of the appended claims are reserved.

We claim:

1. A rim brake for a bicycle, the rim brake comprising:
   a first brake arm, a first pivot of the first brake arm adapted to be pivotally mounted to a first mounting location on the bicycle, a first pad holder downwardly extending from the first pivot and pivoting around the first pivot in a first angular direction responsive to actuation of the brake;
   a second brake arm, a second pivot of the second brake arm adapted to be pivotally mounted to a second mounting location on the bicycle, the second pivot horizontally spaced from the first pivot, a second pad holder downwardly extending from the second pivot and pivoting around the second pivot in a second angular direction opposite the first angular direction responsive to actuation of the brake;
   a biasing member of the second brake arm upwardly extending from the second pivot and pivoting around the second pivot with the second pad holder as a unit;
   a force transfer member of the second brake arm upwardly extending from the second pivot and operable to transmit torque to the second pad holder in the second angular direction upon actuation of the brake;
   a hydraulic piston having a piston actuation axis, wherein the piston actuation axis pivots around the second pivot upon actuation of the rim brake; and
   a centering member adjoining the transfer member and the biasing member, the centering member defining an angular position of the force transfer member relative to the biasing member, the centering member adjustable to move the second pad holder without moving the first pad holder.

2. The rim brake of claim 1, wherein the force transfer member is a second force transfer member, the brake further comprising: a first force transfer member of the first brake arm extending upwardly from the first pivot, the first force transfer member imparting torque in the first angular direction to the first pad holder upon actuation of the brake.

3. The rim brake of claim 2, further comprising a spring connected to the first force transfer member and the biasing member to urge the first force transfer member toward the biasing member of the second brake arm.

4. The rim brake of claim 3, wherein the centering member comprises a set screw threadedly received into a bore of the biasing member, an end of the set screw abutting a surface of the second force transfer member.

5. The rim brake of claim 1, further comprising a hydraulic piston assembly.

6. The rim brake of claim 5, wherein the hydraulic piston assembly includes the hydraulic piston slidably mounted in a piston housing of the second brake arm.

7. The rim brake of claim 6, wherein the hydraulic piston assembly is configured such that the hydraulic piston advances along the piston actuation axis responsive to hydraulic fluid pressure to cause a non-horizontal force to be exerted on the first brake arm to move a second brake pad holder in an arcuate direction around the second pivot.

8. The rim brake of claim 1, further comprising a first force transfer member of the first brake arm, the first force transfer member upwardly extending from the first pivot, and a first contact surface on the first force transfer member in contact with a second contact surface on the force transfer member of the second brake arm to impart torque to the force transfer member of the second brake arm in an arcuate direction around the second pivot.

9. The rim brake of claim 8, wherein the second contact surface on the second force transfer member of the second brake arm is a transfer cam surface and the first contact surface on the first force transfer member of the first brake arm is a roller, which rolls against the transfer cam surface.

10. The rim brake of claim 9, wherein the transfer cam surface is so shaped that a first brake pad holder and a second brake pad holder move at the same speed around the first and second pivots.

11. The rim brake of claim 9, wherein the transfer cam surface is located closer to the second pivot than the hydraulic piston.

12. The rim brake of claim 9, wherein the transfer cam surface is located in an upper and inboard direction from the second pivot.

13. The rim brake of claim 9, wherein the first brake arm includes a piston cam surface, an end of the hydraulic piston abuts the piston cam surface, the piston cam surface is located in an upper and inboard direction from the first pivot.

14. The rim brake of claim 13, wherein the piston cam surface and the transfer cam surface are so shaped that a transfer cam force acting on the transfer cam surface by the first force transfer member will always be parallel to the piston actuation axis.

15. The rim brake of claim 1, wherein actuation of the hydraulic piston causes the first and second pad holders to move in opposed inboard directions at the same speed.

16. The rim brake of claim 1, further comprising a spring which urges the first and second pad holders in opposed outboard directions.

17. The rim brake of claim 1, wherein the hydraulic piston is located in an upper direction from the second pivot.

* * * * *